US011208041B2

(12) United States Patent
Pereira et al.

(10) Patent No.: US 11,208,041 B2
(45) Date of Patent: Dec. 28, 2021

(54) METHOD FOR DETERMINING A CAMERA PARAMETER FOR A CAMERA OF A PICKUP VEHICLE BY A REGRESSION-ANALYSIS ALGORITHM, COMPUTER PROGRAM PRODUCT, ELECTRONIC COMPUTING DEVICE AS WELL AS CAMERA SYSTEM

(71) Applicant: Connaught Electronics Ltd., Tuam (IE)

(72) Inventors: Leroy Francisco Pereira, Tuam (IE); Ciaran Hughes, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 0 days.

(21) Appl. No.: 17/121,973

(22) Filed: Dec. 15, 2020

(65) Prior Publication Data

US 2021/0188170 A1    Jun. 24, 2021

(30) Foreign Application Priority Data

Dec. 19, 2019  (DE) .................... 10 2019 135 189.8

(51) Int. Cl.
*B60R 1/02* (2006.01)
*G06K 9/00* (2006.01)
*G06K 9/32* (2006.01)

(52) U.S. Cl.
CPC ............ *B60R 1/02* (2013.01); *G06K 9/00791* (2013.01); *G06K 9/3233* (2013.01); *B60R 2300/60* (2013.01); *B60R 2300/802* (2013.01)

(58) Field of Classification Search
CPC . B60R 1/02; B60R 2300/60; B60R 2300/802; G06K 9/00791; G06K 9/3233
See application file for complete search history.

(56) References Cited

U.S. PATENT DOCUMENTS

| 10,404,909 | B1 * | 9/2019 | Rosenblatt | ......... H04N 5/23206 |
| 10,913,494 | B2 * | 2/2021 | Ling | ..................... B60K 37/06 |
| 10,946,897 | B2 * | 3/2021 | Niewiadomski | ......... B60D 1/62 |

(Continued)

OTHER PUBLICATIONS

German Search Report Issued in corresponding German Application No. 102019135189.8, dated Sep. 11, 2020 (49 Pages).

*Primary Examiner* — James M Pontius
(74) *Attorney, Agent, or Firm* — Osha Bergman Watanabe & Burton LLP

(57) ABSTRACT

A method for determining a camera parameter for a camera (3) of a camera system (2) of a pickup vehicle (1) includes capturing a cargo bed (5) of the pickup vehicle (1) in an image (18) captured by using the camera (3), determining at least one first cargo bed edge line of the cargo bed (5) by optical analysis of the captured image (18) by using an electronic computing device (4) of the camera system (3), providing a function parameter for a cost function (15) by analysis of at least one first cargo bed edge line by using a regression-analysis algorithm of a solver module (14) of the electronic computing device (4), and determining the camera parameter on the basis of the cost function (15) depending on the provided function parameter by using the electronic computing device (4). A computer program product, an electronic computing device (4) as well as a camera system (2) are also disclosed.

13 Claims, 2 Drawing Sheets

(56) References Cited

U.S. PATENT DOCUMENTS

Figure 1:
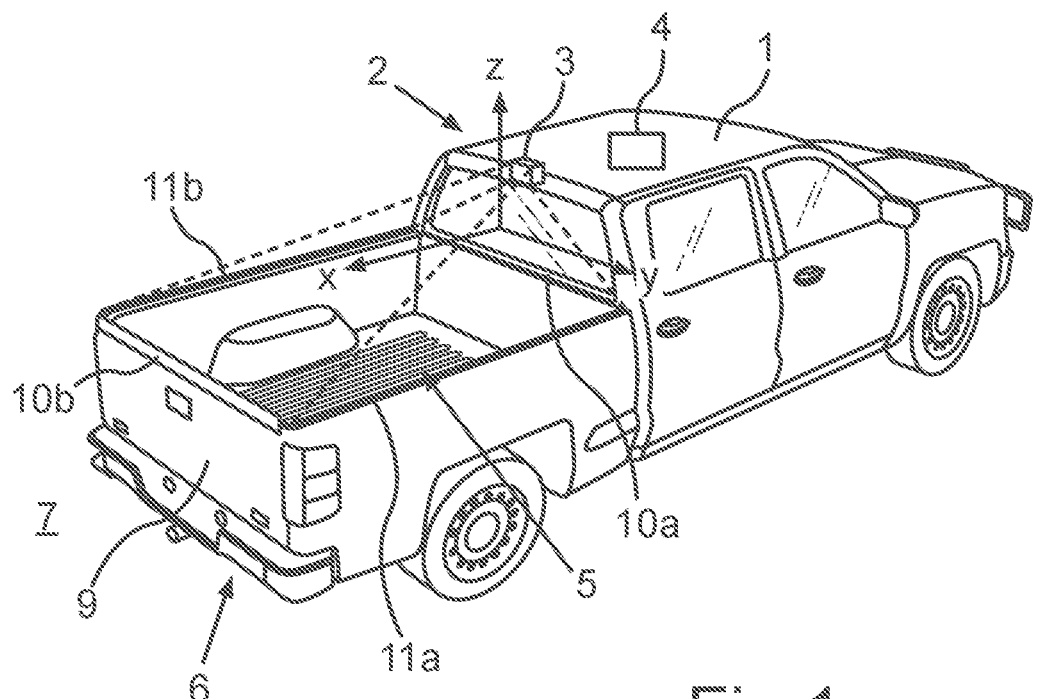

| | | | |
|---|---|---|---|
| 2014/0309888 A1* | 10/2014 | Smit | B62D 15/0275 |
| | | | 701/41 |
| 2017/0243374 A1 | 8/2017 | Matsuzawa | |
| 2018/0118199 A1* | 5/2018 | Chaney, Jr. | B60W 10/20 |
| 2018/0312022 A1* | 11/2018 | Mattern | G05D 1/0225 |
| 2018/0312112 A1* | 11/2018 | Lewis | B60R 1/003 |
| 2018/0342082 A1 | 11/2018 | Lewis et al. | |

\* cited by examiner

METHOD FOR DETERMINING A CAMERA PARAMETER FOR A CAMERA OF A PICKUP VEHICLE BY A REGRESSION-ANALYSIS ALGORITHM, COMPUTER PROGRAM PRODUCT, ELECTRONIC COMPUTING DEVICE AS WELL AS CAMERA SYSTEM

The invention relates to a method for determining a camera parameter for a camera of a camera system of a pickup vehicle. Further, the invention relates to a computer program product, an electronic computing device as well as a camera system.

From the prior art already pickup vehicles, which can also be referred to as pickup, are known, which have a cargo bed, wherein the cargo bed can be closed in particular by a tailgate. In particular the tailgate can be swung between a closed position and an open position. In the closed position the cargo bed forms a cargo space that is open towards the top. In the open position at least on the side of the tailgate this cargo space is opened so that a loading from a tail side of the motor vehicle via the tailgate is facilitated. Further it is possible that on the cargo bed a trailer can be arranged.

Further it is known that on the pickup vehicle, in particular in the region of the third rear light, a camera is arranged. This camera is also referred to as Center High Mount Stop Light Camera (CHMSL Camera). This camera is arranged in such a way on the pickup vehicle that it can capture a rear region of the motor vehicle. In particular the camera in this connection captures a cargo bed of the motor vehicle.

Further, from the prior art geometric solver modules are known which in particular require the capturing of four cargo bed edge lines in order to determine a corresponding camera parameter for the camera. As camera parameter can be regarded in particular the extrinsic parameters of the camera, i. e. a rotation and/or a translation of the camera relative to the motor vehicle.

It is the object of the present invention to provide a method, a computer program product, an electronic computing device as well as a camera system, by which in a simplified way a camera parameter for the camera of the pickup vehicle can be determined.

This object is achieved by a method, a computer program product, an electronic computing device as well as a camera system according to the independent patent claims. Advantageous embodiments are indicated in the subclaims.

One aspect of the invention relates to a method for determining a camera parameter for a camera of a camera system of a pickup vehicle. A capturing of a cargo bed of the pickup vehicle in an image captured by the camera is effected. A determining of at least one first cargo bed edge line of the cargo bed by optical analysis of the captured image by the electronic computing device of the camera system. A determining of a function parameter for a cost function by analyzing the at least one cargo bed edge line by using a regression-analysis algorithm of a solver module of the electronic computing device is effected. A providing of the camera parameter on the basis of the cost function depending on the provided function parameter by means of the electronic computing device is effected.

Thereby it is facilitated that at reduced effort and, in particular if merely a single cargo bed edge line is detected, already a camera parameter or an extrinsic value for the camera can be determined.

In particular, the regression-analysis algorithm may be a least squares method, such as a Levenberg-Marquardt algorithm. In the following examples, the method using the Levenberg-Marquardt algorithm is presented. However, this is for illustrative purposes only and should by no means be regarded as conclusive.

This has in particular the advantage, since for instance not always all four cargo bed edge lines of the cargo bed can be captured. In particular the cargo bed comprises two horizontal and substantially parallely configured cargo bed edge lines, which in particular can also be referred to as longitudinal edge line and in particular extend in the direction of the longitudinal direction of the pickup vehicle. Further, the cargo bed has two equally substantially parallely arranged transversal edge lines, which in particular extend in the direction of a transversal axis of the pickup vehicle. In particular in this connection a front side transversal edge line of the cargo bed and a tail side transversal edge line of the cargo bed is configured, which for instance can include the tailgate. By the four cargo bed edge lines again a cargo space is formed, which in particular has a predetermined height, so that for instance deposited goods can be arranged in this cargo space. Further also to a coupling device on the cargo bed for instance a trailer can be attached.

For instance by shadowing or by arranging a trailer on the cargo bed it may occur that for instance only one cargo bed edge can be optically captured. In order to still be able to reliably determine a camera parameter for the camera it is envisaged according to the invention that the regression-analysis algorithm in the solver module is used.

In the following in particular as the longitudinal direction of the motor vehicle or the pickup vehicle an x axis is to be regarded. As the transverse axis of the motor vehicle in particular a y axis is to be regarded. As the vertical axis of the motor vehicle in particular a z axis is to be regarded.

The camera is in particular a central high-mounted camera in the region of the third brake light of the pickup vehicle. This camera is also referred to as Center High Mount Stop Light Camera (CHMSL Camera). By means of the camera it is in particular facilitated that a cargo bed of the motor vehicle can be captured. The pickup vehicle can in particular also be referred to as pickup vehicle. The camera is in particular already mounted on the motor vehicle and for instance configured for observation of a trailer arranged on the trailer. Additionally now the state of the tailgate can be captured by means of the method according to the invention.

In particular it is facilitated by the camera of the pickup vehicle to generate a so-called top view, in other words a plan view, of the cargo bed. Due to the arrangement of the camera thereby distortions may occur, which in particular can be compensated for in particular on the basis of the camera parameter. In particular for determining the cargo bed edge line for instance a cluster method or a canny filtering can be performed. The cargo bed edge line then has in particular x, y points over the surface area of the cargo bed. These x, y points are then in turn forwarded to the solver module, which depending on the corresponding function parameters perform a fitting. These function parameters in turn are provided to the cost function, which is retrieved for every iteration of the Levenberg-Marquardt algorithm.

The orientation error is in particular an error of the camera setup. In other words, the camera can have been incorrectly set up/mounted in particular with respect to the three motor vehicle axes (longitudinal axis, transverse axis, vertical axis) for example in mounting the camera. Thus, the camera can in particular have an actual pose, which deviates from a desired pose, in particular of a reference camera. This deviation is referred to as orientation error.

In particular, the camera can be disposed at a rearward directed stoplight/brake light, which can also be referred to as third stoplight/brake light. In particular, the camera can be formed as a separate component to the stoplight or as an integral constituent of the stoplight.

Preferably, it can be provided that for recognizing the calibration object, hence the cargo bed, within the captured image, a corresponding evaluation of the image, for example by means of an image processing program, is performed.

In particular, it can be provided that the calibration object is a part of the motor vehicle and thus not a separate component. Thus, the determination of the camera parameter can be performed reduced in effort and without additional component. Furthermore, the determination of the camera parameter can be performed by means of the method within an image, in other words, without having to capture a further image.

The procedure according to the invention is presented for a cargo bed of a pickup, but can also be used for example for a loading area of a van, for example in the interior of the van. The method can also be used, for example, for a truck with a corresponding loading area. This means that the process is not restricted to a flatbed vehicle.

According to an advantageous embodiment at least a second cargo bed edge line of the cargo bed is captured and analyzed, wherein the function parameter is additionally determined depending on the second cargo bed edge line. Thereby it is facilitated that in particular at least across two planes, in other words at least two-dimensionally, a camera parameter can be determined.

According to a further advantageous embodiment in a capturing of the first cargo bed edge line and the second cargo bed edge line as at least substantially parallel cargo bed edge lines as constraint, wherein the two cargo bed edge lines correspond to the longitudinal edge lines of the cargo bed, a two-dimensional rotation correction value is determined as camera parameter. In other words, the first cargo bed edge line and the second cargo bed edge line are in particular the horizontal cargo bed edge lines. In particular thereby a two-dimensional rotation along the y-z direction can be determined. In particular thus the two parallel and horizontal cargo bed edge lines are determined. Then x, y pixel coordinates of each longitudinal edge lines are determined. Thereby it is facilitated that an improved camera parameter for the camera can be determined.

Further, it has turned out to be advantageous if for determining the two-dimensional rotation correction value a first relative slope of the first cargo bed edge line and a second relative slope of the substantially parallel second cargo bed edge line are determined. In particular the relative inclination can correspond to a so-called "slope". All detected points of the cargo bed are used and the "slope" is noise reduced estimated. It is therefore a slope of a linear regression. For each cargo bed edge line the slope, which is to be seen in particular relative in the image, is then determined by means of the formula:

$$m = \frac{\sum_{i=1}^{n}(x_i - \bar{x})(y_i - \bar{y})}{\sum_{i=1}^{n}(x_i - \bar{x})^2};$$

i iterates over the n points captured in an edge, $x_i$, $y_i$ are the pixel positions of the edge, and $\bar{x}$, $\bar{y}$ is the average of all pixel positions of the edge. Once the corresponding slope of a respective horizontal cargo bed edge line is determined, the slope is minimized using the following function:

$$\Sigma_{k=0}^{m} |m_k - \tan(\theta_k)|;$$

k iterates over the vertical lines and m_k is the slope against the x axis. The angle $\theta k$ and the associated slope $\tan(\theta_k)$ can then be derived from the size indications of the cargo bed. Thereby in a simple way the camera parameter can be determined.

In a further advantageous embodiment at least one predetermined size indication of the cargo bed and/or the pickup vehicle is considered in the determination of the rotation correction value. In particular depending on the predetermined size indication of the cargo bed the slope is derived. In particular thus on the basis of the suggested method thus the angle between an "ideal line shape" of the size indication and the captured points on the cargo bed edge line is minimized.

The suggested method steps are then repeated for both cargo bed edge lines until the cost function has a minimum. Thereby it can be realized that both cargo bed edge lines are positioned flat and parallel to each other. By this cost function the rotation correction value in the y-z direction can be determined in an improved way. On the basis of this camera parameter in turn then the top view can be generated in an improved way.

In a further advantageous embodiment in a capturing of the first cargo bed edge line and the second cargo bed edge line as cargo bed edge lines that are at least substantially perpendicular relative to each other as function parameter, wherein at least one of the cargo bed edge lines corresponds to a longitudinal edge line of the cargo bed and the other cargo bed edge line corresponds to a transverse edge line, a three-dimensional rotation correction value is determined as camera parameter. In particular thus the camera parameter can be determined with regard to the x, y, z direction. In particular for this purpose at least a longitudinal edge line and a transverse edge line are necessary. Thereby in particular the corresponding x, y pixel coordinates of each of the captured cargo bed edge lines is known. Thereby it is facilitated that the camera parameter for the camera can be determined in an improved way.

Further it has turned out to be advantageous if for determining the three-dimensional rotation correction value a first relative slope of the first cargo bed edge line and a second relative slope of the substantially perpendicular second cargo bed edge line are determined. In particular by the formulas:

$$m_k = \frac{\sum_{i=1}^{n}(x_i - \bar{x})(y_i - \bar{y})}{\sum_{i=1}^{n}(x_i - \bar{x})^2};$$

$$m_l = \frac{\sum_{i=1}^{n}(y_i - \bar{y})(x_i - \bar{x})}{\sum_{i=1}^{n}(y_i - \bar{y})^2};$$

the respective slope can be determined, wherein mk is the slope for the horizontal lines against the x axis and ml is the slope of the vertical line against the y axis. It may then in particular be envisaged that by the cost function:

$$\Sigma_{k=1}^{n_h} |m_k - \tan(\theta_k)| + \Sigma_{l=1}^{n_v} |m_l - \tan(\theta_l + 90°)|;$$

the camera parameter can be determined, wherein k iterates over the vertical lines and m_k is the slope against the x axis. l iterates over the vertical lines and M_l is the angle against the y axis. N_h and n_v is the number of the horizontal lines and the vertical lines. For the vertical lines it is facilitated that 90 degree are added to the size indications of the cargo bed in order to be determined against the other axes.

It is further advantageous if a number of the captured longitudinal edge lines relative to the number of captured transverse edge lines are considered by a weighting in the cost function. In particular it is thereby facilitated that within the cost function it can be considered if for instance two longitudinal edge lines are captured or only one transverse edge line is captured. In particular this can be determined by using the formula:

$$\left(1 - \frac{n_h}{n}\right)\sum_{k=1}^{n^h} |m_k - \tan(\theta_k)| + \left(1 - \frac{n_v}{n}\right)\sum_{l=1}^{n^v} |m_l - \tan(\theta_l + 90°)|;$$

wherein n is the total number of edges (n=n_h+n_v). This generates in particular a higher weighting of the cargo bed edges, which in the corresponding direction are configured to be less. Thereby it is facilitated that these function parameters cause the horizontal edges to be represented as horizontal and the vertical edges to be represented as vertical. Thereby it is facilitated that by the solver module the rotation in the direction of the x, y, z direction can be determined, wherein the cost function is minimized. If the Levenberg-Marquardt algorithm reaches the minimum of the cost function, the rotation correction value is output in order to be able to perform the correction of the camera.

It is further advantageous, if depending on the at least one first captured cargo bed edge line and in dependence on the at least one predetermined size indication of the cargo bed as function parameter a one-dimensional translation correction value is determined as camera parameter. In particular it is thereby facilitated that a camera parameter along a z direction can be determined. In particular thereby the translation correction value can be determined. This is based in particular on the fact that for instance the length and the width of the cargo bed surface are known. In particular thus the length of the vertical and the horizontal edge are known and the height of the cargo bed is equally known. Thereby it is facilitated in a simple way already only upon recognition of a cargo bed edge line a camera parameter can be determined.

It is further advantageous if as size indication a height of the cargo bed is predetermined. In particular it is thereby facilitated in a first step that the cargo bed edge within the image is captured and projected into the camera space and thus into the horizontal plane, whereby the predetermined heights of the cargo bed can be indicated in millimeters. If for instance it is envisaged that a horizontal edge is captured as first longitudinal edge line, by using the formula:

$$\min\{|x_{0_{mm}} - x_{1_{mm}}| - \text{Länge\_der\_Kante}\};$$

the cost function is realized. Should a vertical edge be predetermined as function parameter of the cost function, by using the formula:

$$\min\{|y_{0_{mm}} - y_{1_{mm}}| - \text{Länge\_der\_Kante}\};$$

the camera parameter can be determined. For this purpose it is in particular made use of the fact that the lengths of the respective cargo bed edges are known from the size indication of the cargo bed. The solver module will solve the positional changes against the x, y, z direction by same minimizing the cost function based on the function parameters. If the Levenberg-Marquardt algorithm reaches a local minimum, a positional deviation is determined, which is determined as camera parameter, in particular as translation correction value. Herein in particular the rotations are predetermined as constant, since in particular by the solver module the rotation function parameters were determined.

A further aspect of the invention relates to a computer program product with program code means, which are stored in a computer-readable medium in order to perform the method for determining a camera parameter according to a preceding aspect if the computer program product is executed on a processor of an electronic computing device.

A further aspect of the invention relates to an electronic computing device comprising a computer program product according to the preceding aspect.

Yet a further aspect of the invention relates to a camera system for a pickup vehicle with at least one camera and with an electronic computing device according to the preceding aspect, wherein the camera system is configured for performing a method according to the preceding aspect. In particular the method is performed by using the camera system.

Yet a further aspect of the invention relates to a motor vehicle comprising a camera system. Yet a further aspect of the invention relates to a pickup vehicle comprising a camera system according to the preceding aspect. Alternatively, the motor vehicle can also be designed as a van or as a truck.

Advantageous embodiments of the method are to be regarded as advantageous embodiments of the computer program product, the electronic computing device as well as the camera system. The camera system as well as the electronic computing device for this purpose comprise substantive features, which facilitate a performance of the method or an advantageous embodiment thereof.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by the separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the back-references of the claims.

The invention is now explained in more detail based on preferred embodiments as well as with reference to the attached drawings.

Figure 2:
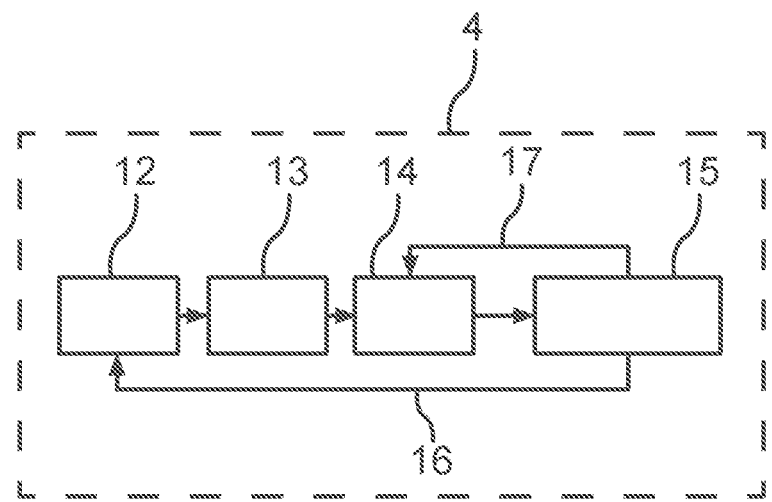
Figure 3:
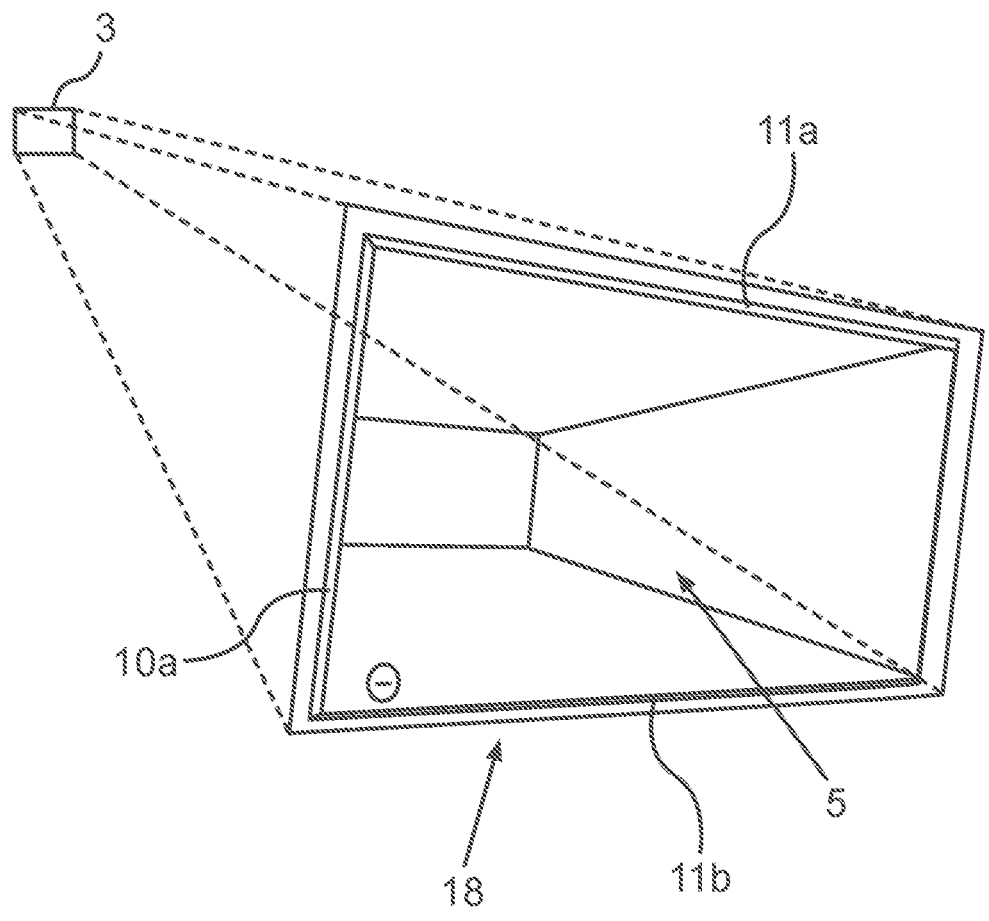

These show in:

FIG. 1 a schematic perspective view of an embodiment of a pickup vehicle with an embodiment of a camera system;

FIG. 2 a schematic block diagram of an embodiment of an electronic computing device; and FIG. 3 a schematic view of an image taken by the camera.

In the figures same elements and elements having the same function are equipped with the same reference signs.

FIG. 1 shows in a schematic perspective view an embodiment of a pickup vehicle 1 with an embodiment of a camera system 2. The pickup vehicle 1 is in particular a motor vehicle. The camera system 2 comprises at least one camera 3 as well as an electronic computing device 4. The camera 3 is in particular configured as central high-mounted brake light camera. In other words, it is in particular envisaged that by using the camera 3 a cargo bed 5 of the pickup vehicle 1 can be captured. The camera 3 thus is oriented in the direction of a tail 6 of the pickup vehicle 1 so that a rear space 7 of the pickup vehicle 1 can be captured.

The camera 3 is in particular a central high-mounted camera 3 in the region of the third brake light of the pickup vehicle 1. This camera 3 is also referred to as Center High Mount Stop Light Camera (CHMSL camera). By using the camera 3 it is in particular facilitated that a cargo bed 5 of the motor vehicle can be captured. The pickup vehicle 1 can in particular also be referred to as pickup vehicle. The camera 3 is in particular already mounted on the motor vehicle and for instance configured for observation of a trailer arranged on the pickup. Additionally now the camera parameter for the camera 3 can be determined.

The cargo bed 5 is in particular bounded by the four cargo bed edge lines 10a, 10b, 11a, 11b. Two transverse edge lines 10a and 10b, wherein thereby one front side transverse edge line 10a and one rear side transverse edge line 10b are formed, which in particular extend in parallel to each other along a y direction of the pickup vehicle 1. For instance the rear side transverse edge line 10b can be configured as part of a tailgate 9. Two longitudinal edge lines 11a, 11b, wherein thereby one right longitudinal edge line 10a and one left longitudinal edge line 10b are formed, which in particular extend substantially relative to each other along an x direction of the pickup vehicle 1. Further the pickup vehicle also has a vertical axis in a z direction.

FIG. 2 in a schematic block diagram shows an embodiment of the electronic computing device 4. The electronic computing device 4 in particular comprises a top view generator 12. Further the electronic computing device 4 comprises an edge detector 13. Moreover the electronic computing device 4 comprises a regression-analysis algorithm, which in particular is configured in a solver module 14. Further in particular by the use of a cost function 15 a camera parameter is determined. Should the cost function 15 be minimized and correspond to a "true", by the arrow 16 this is reintroduced into the top view generator 12. Should the minimizing of the cost function yield a "false", this is represented by the arrow 17, wherein this in turn is reintroduced into the solver module 14.

In particular, the regression analysis algorithm may be a least squares method, such as a Levenberg-Marquardt algorithm. In the following examples, the method using the Levenberg-Marquardt algorithm is presented. However, this is for illustrative purposes only and should by no means be regarded as conclusive.

In the method for determining the camera parameter for the camera 3 of the camera system 2 of the pickup vehicle 1 the capturing of the cargo bed 5 of the pickup vehicle 1 is effected by the camera 3 in a captured image 18 (FIG. 3). A determining of at least one first cargo bed edge line 10a, 10b, 11a, 11b of the cargo bed 5 is effected by optical analysis of the captured image 18 by using the electronic computing device 4 of the camera system 2. The providing of a function parameter for the cost function 15 is effected by analysis of the at least first cargo bed edge line 10a, 10b, 11a, 11b by a Levenberg-Marquardt algorithm of the solver module 14 of the electronic computing device 4. A determining of the camera parameter is effected on the basis of the cost function 15 depending on the provided function parameter by the electronic computing device 4.

FIG. 3 in a schematic perspective view shows an embodiment of a captured image 18. In the present embodiment it is shown in particular that three cargo bed edge lines 10a, 10b, 11a, 11b were captured. In the following the cargo bed edge lines 10a, 11a, and 11b are captured.

In particular thus FIG. 3 shows that at least one second cargo bed edge line 10a, 10b, 11a, 11b of the cargo bed 5 is captured and analyzed, wherein the function parameter is determined additionally depending on the second cargo bed edge line 10a, 10b, 11a, 11b.

It may for instance be envisaged that in the capture of the first cargo bed edge line 10a, 10b, 11a, 11b and the second cargo bed edge line 10a, 10b, 11a, 11b as at least substantially parallel cargo bed edge lines 10a, 10b, 11a, 11b as function parameter, wherein the two cargo bed edge lines 10a, 10b, 11a, 11b correspond to longitudinal edge lines of the cargo bed 5, a two-dimensional rotation correction value is determined as camera parameter. In particular for this purpose for determining the two-dimensional rotation correction value of a first relative slope of the first cargo bed edge line 10a, 10b, 11a, 11b and a second relative slope of the substantially parallel second cargo bed edge line 10a, 10b, 11a, 11b are determined. For this purpose it may for instance be envisaged that at least one predetermined size indication of the cargo bed 5 and/or the pickup vehicle 1 are considered in the determination of the rotation correction value.

In particular this is represented in FIG. 3 by the fact that for instance the lines along the x direction are captured as longitudinal edge lines 11a and 11b. In other words it may be envisaged that by the camera 3 the longitudinal edge lines 11a and 11b are captured, which are substantially parallel to each other. Then the corresponding x, y pixel coordinates of the longitudinal edge lines 11a, 11b are assumed to be known. Then the slope for each of the longitudinal edge lines 11a, 11b is determined. Then by using the cost function:

$$\Sigma_{k=0}^{m}|m_k-\tan(\theta_k)|;$$

the slope is minimized, wherein k increases over the vertical lines and m_k corresponds to the slope against the x direction. The angle θk, in particular the slope, is then determined based on the size indication of the cargo bed 5. In particular thereby the slope between the ideal form and the measured data is minimized. This method is in particular performed for both longitudinal edge lines 11a, 11b. Thereby it is facilitated that for both longitudinal edge lines 11a, 11b these are minimized in such a way that they are flat and parallel. Thereby a rotation correction value along the y, z direction can be realized.

Further, it may in particular be envisaged that, when capturing the first cargo bed edge line 10a, 10b, 11a, 11b and the second cargo bed edge line 10a, 10b, 11a, 11b as at least substantially perpendicular cargo bed edge lines 10a, 10b, 11a, 11b relative to each other as function parameter, wherein at least one of the cargo bed edge lines 10a, 10b, 11a, 11b corresponds to a longitudinal edge line 11a, 11b of the cargo bed 5 and the other cargo bed edge lines 10a, 10b, 11a, 11b corresponds to a transverse edge line 10a, 10b, a three-dimensional rotation correction value is determined as camera parameter.

Here it could then be in particular envisaged that for determining the three-dimensional rotation correction value a first relative slope of the first cargo bed edge line 10a, 10b, 11a, 11b and a second relative slope of the substantially perpendicular second cargo bed edge line 10a, 10b, 11a, 11b are determined.

In the present embodiment this corresponds in particular to the fact that for instance the transverse edge line 10a is captured and for instance the longitudinal edge line 11a and the longitudinal edge line 11b. In other words in particular two horizontal edges and one vertical edge are captured, wherein these are in particular configured to be perpendicular relative to the two other edges. In particular thereby the x and y pixel coordinates of the respective edges are known. Then the determination of the respective slopes of the longitudinal edge lines of the cargo bed edge lines 10a, 10b, 11a, 11b is effected by using the formulas:

$$m_k = \frac{\sum_{i=1}^{n}(x_i - \bar{x})(y_i - \bar{y})}{\sum_{i=1}^{n}(x_i - \bar{x})^2};$$

$$m_l = \frac{\sum_{i=1}^{n}(y_i - \bar{y})(x_i - \bar{x})}{\sum_{i=1}^{n}(y_i - \bar{y})^2};$$

wherein mk corresponds to the slope for the horizontal lines against the x axis and ml corresponds to the slope of the vertical lines against the y direction. The following cost function:

$$\Sigma_{k=1}^{n_h}|m_k - \tan(\theta_k)| + \Sigma_{l=1}^{n_v}|m_l - \tan(\theta_l + 90°)|;$$

is then minimized, wherein k iterates over the vertical lines, m_k corresponds to the slope against the x direction. l iterates over the vertical lines and m_l is the angle against the y direction. n_h and n_v corresponds to the number of the horizontal and vertical lines. For the vertical lines 90 degree can be added to the predetermined size indications of the cargo bed 5 in order to obtain thus the angle against the other axes.

Further it may be envisaged that a number of the captured longitudinal edge lines 10a, 10b, 11a, 11b relative to the number of captured transverse edges 11a, 11b relative to the number of captured transverse edge lines 10a, 10b can be considered by applying a weighting in the cost function 15. In particular this can be performed by using the formula $$\left(1 - \frac{n_h}{n}\right)\sum_{k=1}^{n_h}|m_k - \tan(\theta_k)| + \left(1 - \frac{n_v}{n}\right)\sum_{l=1}^{n_v}|m_l - \tan(\theta_l + 90°)|;$$

wherein n corresponds to the total number of edges. Thereby it is facilitated that the horizontal edges are predetermined as horizontal and the vertical edges as vertical in the surface area. Thereby the top view of the cargo bed 5 can be generated in an improved way.

Furthermore it may be envisaged that depending on the at least one first captured cargo bed edge line 10a, 10b, 11a, 11b and depending on at least one predetermined size indication of the cargo bed 5 as function parameter a one-dimensional translation correction value is determined as camera parameter. For this purpose it may in particular be envisaged that as size indication a height of the cargo bed 5 is predetermined.

In particular thus by the solver module 14 the translation based on the known sizes of the cargo bed 5 can be performed. Should for instance the length of a cargo bed edge line 10a, 10b, 11a, 11b and the height of the cargo bed 5 be known, in a first step the respective edge is detected and projected onto the camera space, wherein this in turn is then performed to the horizontal plane at given height. This is indicated in particular in millimeters. Should it for instance be envisaged that a horizontal edge is captured as first longitudinal edge line 11a, 11, by using the formula:

$$\min\{|x_{0_{mm}} - x_{1_{mm}}| - \text{Länge\_der\_Kante}\};$$

the cost function 15 is realized. Should a vertical edge be predetermined as function parameter of the cost function 15, by using the formula:

$$\min\{|y_{0_{mm}} - y_{1_{mm}}| - \text{Länge\_der\_Kante}\};$$

the camera parameter can be determined. For this purpose it is in particular utilized that the lengths of the respective cargo bed edges are known from the size indications of the cargo bed 5. The solver module 14 will solve the positional change against the x, y, z direction by minimizing the cost function 15 based on the function parameters. If the Levenberg-Marquardt algorithm reaches a local minimum, a positional deviation is determined which is determined as camera parameter, in particular as translation correction value. In this connection in particular the rotations are predetermined as constant, since in particular by the solver module 14 the rotation function parameters were determined.

The invention claimed is:

1. A method for determining a camera parameter for a camera of a camera system of a pickup vehicle, the method comprising:
   capturing a cargo bed of the pickup vehicle in an image captured by using the camera;
   determining at least one cargo bed edge line of the cargo bed by optical analyzing of the captured image using an electronic computing device of the camera system;
   providing a function parameter for a cost function by analyzing the at least one cargo bed edge line using a regression-analysis algorithm of a solver module of the electronic computing device; and
   determining the camera parameter based on the cost function depending on the provided function parameter by using the electronic computing device.

2. The method according to claim 1, wherein at least one second cargo bed edge line of the cargo bed is captured and analyzed, wherein the function parameter is provided in addition to the second cargo bed edge line.

3. The method according to claim 2, wherein in the case of a capturing of the first cargo bed edge line and the second cargo bed edge line as cargo bed edge lines that are at least substantially parallel to each other as function parameter, wherein the two cargo bed edge lines correspond to longitudinal edge lines of the cargo bed, a two-dimensional rotation correction value is determined as camera parameter.

4. The method according to claim 3, wherein for determining the two-dimensional rotation correction value a first relative slope of the first cargo bed edge line and a second relative slope of the substantially parallel second cargo bed edge line are determined.

5. The method according to claim 3, wherein at least one predetermined size indication of the cargo bed and/or of the pickup vehicle are considered in the determination of the rotation correction value.

6. The method according to claim 2, wherein in the case of a capturing of the first cargo bed edge line and the second cargo bed edge line as cargo bed edge lines that are at least substantially perpendicular relative to each other as function parameter, wherein at least one of the cargo bed edge lines corresponds to a longitudinal edge line of the cargo bed and the other one of the cargo bed edge lines corresponds to a transverse edge line, a three-dimensional rotation correction value is determined as camera parameter.

7. The method according to claim 6, wherein for determining the three-dimensional rotation correction value a first relative slope of the first cargo bed edge line and a second relative slope of the substantially perpendicular second cargo bed edge line are determined.

8. The method according to claim 6, wherein a number of captured longitudinal lines relative to the number of the captured transverse edge lines are considered by applying a weighting in the cost function.

9. The method according to claim 1, wherein depending on the at least one first captured cargo bed edge line and depending on the at least one predetermined size indication of the cargo bed as function parameter a one-dimensional translation correction value is determined as camera parameter.

10. The method according to claim 9, wherein as size indication a height of the cargo bed is predetermined.

11. A non-transitory computer-readable medium storing instructions executable by a processor of an electronic computing device, the instructions comprising functionality for determining a camera parameter according to claim 1.

12. An electronic computing device comprising the non-transitory computer-readable medium according to claim 11.

13. A camera system for a pickup vehicle comprising: at least one camera; and an electronic computing device comprising a computer program product with program code means, which are stored in a computer-readable medium, wherein the camera system is configured for performing a method according to claim 1.

* * * * *